United States Patent [19]

O'Neill et al.

[11] 4,018,636
[45] Apr. 19, 1977

[54] SOLUBLE BINDER FOR PLASTIC BONDED EXPLOSIVES AND PROPELLANTS

[75] Inventors: Paul L. O'Neill, China Lake, Calif.; Juan L. Hooper, Glenelg North, Australia

[73] Assignee: The United States of America as represented by the Secretary of the Navy, Washington, D.C.

[22] Filed: Apr. 20, 1976
(Under Rule 47)

[21] Appl. No.: 678,572

[52] U.S. Cl. .............................. 149/19.4; 149/92; 149/93
[51] Int. Cl.[2] .......................................... C06B 45/10
[58] Field of Search ...................... 149/92, 93, 19.4

[56] References Cited

UNITED STATES PATENTS

| | | | |
|---|---|---|---|
| 3,256,214 | 6/1966 | Bluhm | 149/19.4 X |
| 3,296,041 | 1/1967 | Wright | 149/19.4 X |

*Primary Examiner*—Stephen J. Lechert, Jr.
*Attorney, Agent, or Firm*—R. S. Sciascia; Roy Miller; Lloyd E. K. Pohl

[57] ABSTRACT

Explosive compositions utilizing binders which are soluble in water or which hydrolyze under dilute acidic or basic conditions to yield non-toxic products are disclosed. The use of such binders permits one to readily remove the compositions from obsolete warheads or the like. The explosive filler can be reclaimed.

6 Claims, No Drawings

SOLUBLE BINDER FOR PLASTIC BONDED EXPLOSIVES AND PROPELLANTS

BACKGROUND OF THE INVENTION

1. Field of the Invention

This invention relates to plastic bonded explosives. More particularly, this invention relates to explosive compositions which are suitable for use in warheads and the like. Still more particularly, it relates to plastic bonded explosives which can be readily removed from obsolete warheads and from which the explosive filler can be reclaimed.

2. Description of the Prior Art

Explosive compositions utilizing water-soluble binders have been prepared. For example, U.S. Pat. No. 3,586,551 to Edmond J. Nolan describes such explosives. However, to the best of the inventors' knowledge, explosive compositions utilizing the hereinafter disclosed binders have not previously been prepared.

Experiments leading to the present invention were conducted with the idea in mind that it would be desirable to have plastic bonded explosive compositions which could easily be removed from warheads when the warheads became obsolete or otherwise unsuitable for use. Those prior art plastic bonded explosives that have been used in warheads have all utilized binders which are almost completely unreactive toward water, dilute acids or dilute bases. Therefore, in the past, when it has been desirable to remove explosive charges from obsolete warheads, expensive and complicated machining operations have had to be resorted to. When such compositions are removed from warheads, very little reusable material is recovered. Machining yields some granules of composite material which can be reused as molding powder but most of the granules are too large and completely unsuitable for such use.

SUMMARY OF THE INVENTION

According to this invention, explosive compositions containing a high explosive filler such as cyclotrimethylenetrinitramine (RDX), cyclotetramethylenetetranitramine (HMX), pentaerythritol tetranitrate (PETN) or the like and a binder made up of (1) a combination of a hydroxy terminated polyester such as polyglycol adipate and a hydroxy terminated polyether such as the polyethylene oxide/propylene capped oxide glycol adduct of trimethylolpropane, (2) a combination of a polyether such as polyethylene glycol and trimethylolpropane, (3) a combination of a polyether such as polyethylene glycol and another polyether such as the ethylene oxide capped polypropylene glycol adduct of trimethylolpropane or (4) a combination of a polyether such as ethylene oxide capped polypropylene glycol and another polyether such as the ethylene oxide capped polypropylene glycol adduct of trimethylolpropane are utilized in warheads. The binders are cured by means of lysine diisocyanate methyl ester or other isocyanates in the presence of cure catalysts such as dibutyl tin diacetate, ferric acetylacetonate or other urethane cure catalysts and may readily be cast in warheads. Plasticizers may also be used, which are water soluble such as diethoxy tetraglycol and triethylene glycol diacetate. The cast explosive structures disclosed herein may easily be removed from warheads by subjecting them to low pressure jets of water, mild bases such as dilute ammonia solutions or mild acidic solutions.

DESCRIPTION OF THE PREFERRED EMBODIMENT

The preferred embodiments of this invention may be conveniently illustrated by specific examples.

EXAMPLE 1

A composition containing 82.00 weight percent HMX, about 2.43 weight percent of the ethylene oxide capped polypropylene glycol adduct of trimethylolpropane, about 13.85 weight percent of ethylene oxide capped polypropylene glycol, about 1.72 weight percent lysine diisocyanate methyl ester curing agent and a catalytic amount (about 0.0005 weight percent) of dibutyl tin diacetate was mixed, cast in a small cylindrical glass container and allowed to cure. The glass tube was then inverted over a low pressure jet of water and a low pressure jet of a 5% ammonia solution. The binder dissolved in both cases, but was faster dissolving in ammonia solution. The HMX separated out and was collected and dried.

EXAMPLE 2

A composition containing like amounts of all the ingredients of Example 1 with the exception of the catalyst, which was replaced with a similar catalytic amount of ferric acetylacetonate/acetylacetone (0.01/0.0028 weight percent), was mixed, cured and subjected to 5% ammonia solution in the manner described in Example 1. The binder dissolved as in Example 1. The HMX which was retrieved was perfectly reusable. (The acetylacetone acts as a pot life extender by slowing up the catalytic action of the ferric acetylacetonate.)

EXAMPLE 3

A castable explosive formulation containing about 82.00 weight percent HMX (cyclotetramethylenetetranitramine), about 9.26 weight percent of the ethylene oxide capped polypropylene gylcol, about 3.66 weight percent of the ethylene oxide capped polypropylene glycol adduct of trimethylolpropane, about 1.48 weight percent lysine diisocyanate methyl ester curing agent, about 3.60 weight percent of dibutyl carbitol formal plasticizer and a catalytic amount (about 0.001 weight percent) of dibutyl tin diacetate catalyst was mixed, cured and subjected to 5% ammonia solution in the manner described in Example 1. The binder failed to dissolve. The dibutyl carbitol formula being water insoluble, rendered the binder insoluble.

EXAMPLE 4

A group of explosive compositions containing 82 weight percent explosive filler (HMX) and binders according to the following table were made up.

TABLE

| WATER SOLUBLE OR HYDROLYZABLE BINDERS | | | |
|---|---|---|---|
| INGREDIENTS | EQUIVALENT WT. | EQUIVALENT RATIO | WT. % |
| 1. R-18[1] | 900 | 0.6 | 9.00 |

TABLE-continued

WATER SOLUBLE OR HYDROLYZABLE BINDERS

| | INGREDIENTS | EQUIVALENT WT. | EQUIVALENT RATIO | WT. % |
|---|---|---|---|---|
| | HA410[2] | 1066 | 0.4 | 7.02 |
| | LDIM[3] | 106 | 1.10 | 1.98 |
| 2. | PEG 600[4] | 300 | 0.8 | 11.86 |
| | TMP[5] | 45 | 0.2 | 0.45 |
| | LDIM[3] | 106 | 1.10 | 5.69 |
| 3. | PEG 600[4] | 300 | 0.8 | 6.50 |
| | TPE 4542[6] | 1500 | 0.2 | 8.15 |
| | LDIM[3] | 106 | 1.15 | 3.35 |
| 4. | L-35[7] | 950 | 0.8 | 11.52 |
| | TPE 4542[6] | 1500 | 0.2 | 4.50 |
| | LDIM[3] | 106 | 1.15 | 1.98 |

[1]Polyglycol adipate, Mobay Chem.
[2]Polyethyleneoxide/propylene oxide glycol adduct of trimethylolpropane, Wyandotte Corp.
[3]Lysine diisocyanate methyl ester, Dexter Corp.
[4]Polyethylene glycol, Union Carbide.
[5]Trimethylolpropane, Celanese Chem.
[6]Ethylene oxide capped polypropylene glycol adduct of TMP, Wyandotte Corp.
[7]Ethylene oxide capped polypropylene glycol, Wyandotte Corp.

In all cases, the composition had excellent physical properties and could easily be removed from a warhead or warhead-like structure by dissolving the binder with dilute ammonia solution.

In addition to being soluble in dilute ammonia solution, the binders of the compositions disclosed in the foregoing Examples are soluble, although slightly less, in water and in weak acidic solutions. Accordingly, if such compositions are used in warheads, there now exists a process for recovering the high explosive therein, in which the solid explosive compositions are merely exposed to water, a weak base or a weak acid to dissolve the binder and wherein the explosive, which does not dissolve, is then collected. Such a process has not, to the inventors' best knowledge, previously existed. The binders of previously used warhead explosive compositions have not been readily soluble in water, weak bases or weak acids.

The explosive compositions of this invention have densities of from about 1.6g/cm$^3$ upwards, impact sensitivities ranging from about 25cm/2.5kg upwards to 35cm/2.5kg or more, excellent tensile strengths (from 51.8 psi upwards), excellent modulus (662 psi upwards) and excellent elongation. The products produced when the binders are dissolved are non-toxic.

What is claimed is:

1. An explosive composition consisting essentially of an explosive filler selected from the group consisting of cyclotrimethylenetrinitramine, cyclotetramethylenetetranitramine and pentaerythritol tetranitrate and a binder selected from the group consisting of an isocyanate cured mixture of (1) polyglycol adipate and the polyethylene oxide/propylene oxide glycol adduct of trimethylolpropane, (2) polyethylene glycol and trimethylolpropane, (3) polyethylene glycol and the ethylene oxide capped polypropylene glycol adduct of trimethylolpropane, and (4) ethylene oxide capped polypropylene glycol and the ethylene oxide capped polypropylene glycol adduct of trimethylolpropane.

2. An explosive composition according to claim 1 wherein the amount of explosive filler is 82 weight percent and the binder consists of essentially a mixture of 2.43 weight percent ethylene oxide capped polypropylene glycol adduct of trimethylolpropane and 13.85 weight percent ethylene oxide capped polypropylene glycol cured with 1.72 weight percent lysine diisocyanate methyl ester.

3. An explosive composition according to claim 1 wherein the amount of explosive filler is 82 weight percent and the binder consists essentially of a mixure of 9 weight percent polyglycol adipate and 7.02 weight percent polyethylene oxide/propylene oxide glycol adduct of trimethylolpropane cure with 1.98 weight percent lysine diisocyanate methyl ester.

4. An explosive composition according to claim 1 wherein the amount of explosive filler is 82 weight percent and the binder consists essentially of a mixture of 11.86 weight percent polyethylene glycol and 0.45 weight percent trimethylolpropane cured with 5.69 weight percent lysine diisocyanate methyl ester.

5. An explosive composition according to claim 1 wherein the amount of explosive filler is 82 weight percent and the binder consists essentially of a mixture of 6.50 weight percent polyethylene glycol and 8.15 weight percent ethylene oxide capped polypropylene glycol adduct of trimethylolpropane cured with 3.35 weight percent lysine diisocyanate methyl ester.

6. An explosive composition according to claim 1 wherein the amount of explosive filler is 82 weight percent and the binder consists essentially of a mixture of 11.52 weight percent ethylene oxide capped polypropylene glycol and 4.50 weight percent ethylene oxide capped polypropylene glycol adduct of trimethylolpropane cured with 1.98 weight percent lysine diisocyanate methyl ester.

* * * * *